United States Patent [19]
Kubo

[11] Patent Number: 5,949,950
[45] Date of Patent: *Sep. 7, 1999

[54] APPARATUS FOR RECORDING PICKED UP IMAGE SIGNAL ON SECOND MEMORY THROUGH FIRST MEMORY

[75] Inventor: Ryoji Kubo, Chiba-ken, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/623,741

[22] Filed: Mar. 29, 1996

Related U.S. Application Data

[63] Continuation of application No. 08/112,620, Aug. 26, 1993, abandoned.

[30] Foreign Application Priority Data

Aug. 31, 1992 [JP] Japan ..................................... 4-231981
Sep. 9, 1992 [JP] Japan ..................................... 4-240551

[51] Int. Cl.⁶ .............................. H04N 5/76; H04N 5/225
[52] U.S. Cl. .............................. 386/46; 386/117; 348/207
[58] Field of Search ................................... 386/4, 46, 52, 386/64, 38, 113, 116, 117, 118, 119, 120, 125, 126; 358/906, 909.1; 348/207, 714, 715, 716, 718, 719; 369/47, 48, 60; H04N 5/76, 5/225, 5/92

[56] References Cited

U.S. PATENT DOCUMENTS

| | | | |
|---|---|---|---|
| 4,656,516 | 4/1987 | Fling et al. .............................. | 358/183 |
| 4,768,110 | 8/1988 | Dunlap et al. ............................. | 360/15 |
| 5,032,927 | 7/1991 | Watanabe et al. ....................... | 358/335 |
| 5,067,029 | 11/1991 | Takahashi ............................. | 358/909.1 |
| 5,099,338 | 3/1992 | Hirata et al. ............................. | 358/906 |
| 5,150,219 | 9/1992 | Fukushima ............................. | 358/335 |
| 5,177,618 | 1/1993 | Dunlap et al. ............................. | 360/15 |
| 5,194,963 | 3/1993 | Dunlap et al. ............................. | 360/15 |
| 5,206,730 | 4/1993 | Sakai ................................... | 358/909.1 |
| 5,212,678 | 5/1993 | Roth et al. ............................... | 369/60 |
| 5,216,552 | 6/1993 | Dunlap et al. ............................. | 360/15 |
| 5,239,382 | 8/1993 | Hatakenaka et al. ................... | 358/906 |
| 5,432,769 | 7/1995 | Honjo ...................................... | 369/60 |
| 5,523,857 | 6/1996 | Fukushima ........................... | 358/909.1 |
| 5,642,458 | 6/1997 | Fukushima et al. .................... | 386/117 |

FOREIGN PATENT DOCUMENTS

| | | |
|---|---|---|
| 0473516 | 3/1992 | European Pat. Off. . |
| 9013964 | 11/1990 | WIPO . |

*Primary Examiner*—Thai Tran
*Attorney, Agent, or Firm*—Robin, Blecker & Daley

[57] ABSTRACT

A video signal recording apparatus includes a first memory arranged to store an image signal and a second memory arranged to store an image signal outputted from the first memory. These memories are controlled in such a manner that, if a new image signal is inputted to the first memory while the second memory is still in process of storing the image signal outputted from the first memory, a storing action of the second memory is suspended, so the new image signal can be stored in the first memory even while the second memory is in process of storing the image signal.

5 Claims, 8 Drawing Sheets

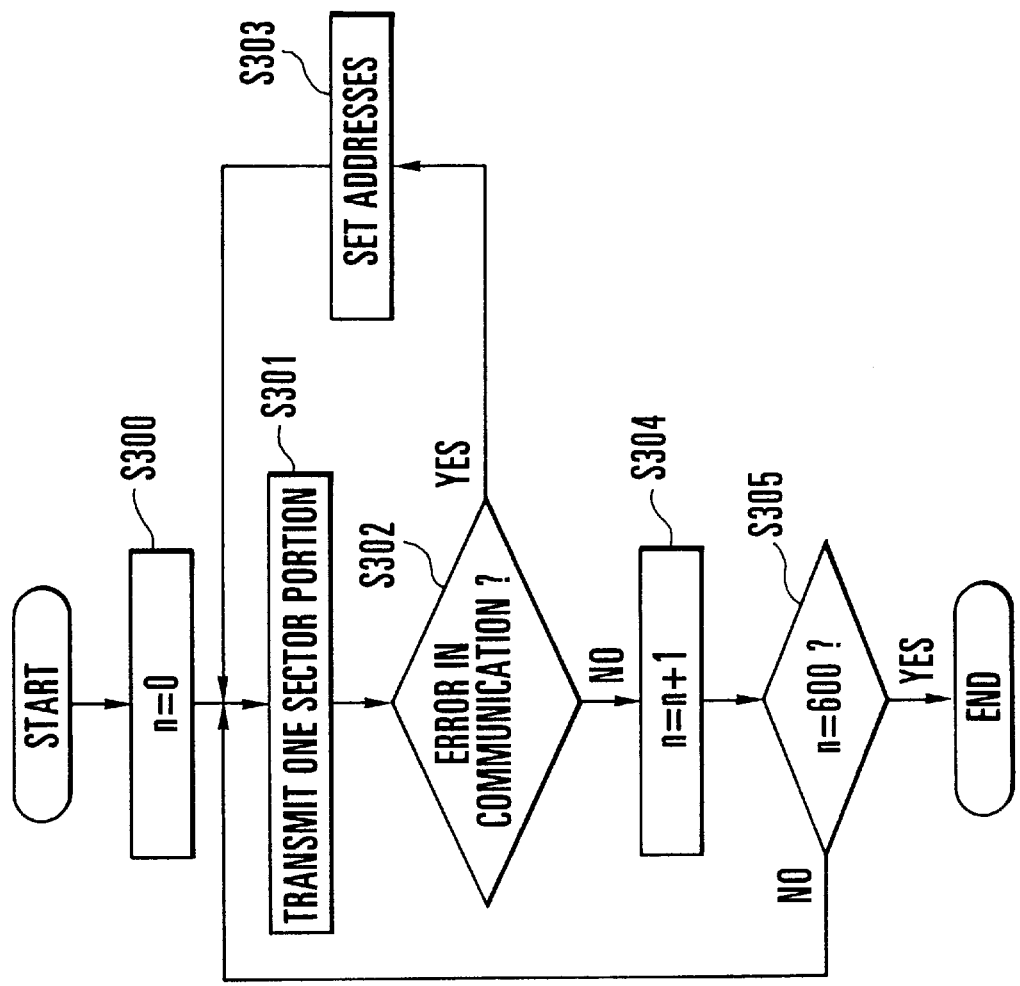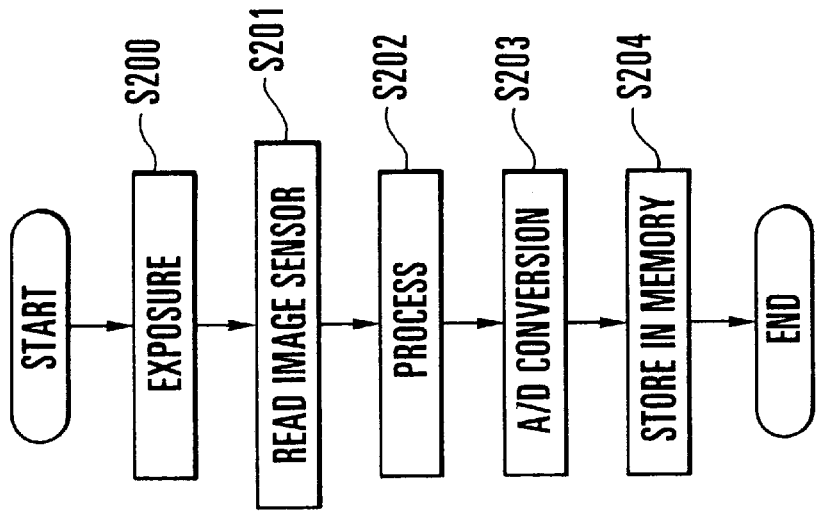

APPARATUS FOR RECORDING PICKED UP IMAGE SIGNAL ON SECOND MEMORY THROUGH FIRST MEMORY

This is a continuation application under 37 CFR 1.62 of prior application Ser. No. 08/112,620 filed Aug. 26, 1993 (abandoned).

BACKGROUND OF THE INVENTION

1. Field of the Invention

This invention relates to an image pickup apparatus of the kind arranged to convert an object image into an electrical signal and to process the electrical signal, and more particularly to management of data stored in a memory included in the apparatus.

2. Description of the Related Art

Electronic cameras have recently been proposed and practicalized as image pickup apparatuses of the kind arranged to convert, by means of a photoelectric converting element, an object image formed by a photo-taking lens into an electrical signal and to record the electrical signal on a recording medium as an analog signal. Some electronic cameras more recently proposed are arranged to digitally store an image signal on a solid-state memory such as a memory card, a hard disk device or the like.

Generally, these electronic cameras have been arranged to perform recording immediately after a shot is taken and to permit taking another shot only after completion of recording if an instruction is given for another shot by means of a switch or the like before completion of the process of recording.

Further, in a case where a hard disk device is to be used as a recording medium, a data storing method which is contrived for use of a hard disk device as an auxiliary storage device for a computer is utilized as it is for the electronic camera. However, for image recording, this data storing method is inconvenient in the following points: In the electronic camera using the conventional digital recording method, the whole recording area of the hard disk device is divided into an information data area and a management data area. Information data is recorded in the information data area by dividing the data into units called clusters, and a state of using the information data area is recorded in the management data area.

While this recording method is convenient for recording information of varied sizes, in the event of handling only information of a fixed size such as image data, it necessitates not only an unnecessarily great amount of management work but also an excessively long period of time for recording, thereby hindering, for example, an attempt to increase the speed of continuous shooting. Further, repetitions of recording and erasure bring about fragmentation to make it impossible to record new image data in consecutive areas. This also hinders an increase in the speed of continuous shooting.

Further, it has been impossible, with the conventional electronic camera, to take any shot until the end of recording when an instruction for shooting is newly given while an image picked up by a previous shot is still in process of recording.

Digital recording methods have come to be used, as mentioned above, as a result of commercialization of large capacity digital recording media such as a hard disk device, a photoelectro-magnetic disk, flash memory, etc., and improvement in the processing capacity of computers which are arranged to be capable of copying without deteriorating picture quality.

Compared with the speed of processing a picked-up image signal, the speed of writing into a recording medium by the electronic camera is slow in general. In view of the slow writing speed, it is generally practiced to have an intermediate memory means arranged before a recording medium such as a hard disk device so as to absorb a difference between the picked-up image processing speed and the writing speed. Such an intermediate memory means may be a FIFO (first-in/first-out) memory. However, since the intermediate memory means is generally arranged to be used also for image processing actions such as compression of the image, attaining some video effect, etc., a random access memory has been popularly employed.

The speed of shooting can be enhanced by increasing the number of pictures which are simultaneously storable in the intermediate memory means. For example, in a case where the picked-up image consists of 640 horizontal picture elements and 480 vertical picture elements (lines), it is theoretically necessary to have at least 640 storage areas in the horizontal direction and at least 480×k (k: number of pictures storable at the same time) storage areas in the vertical direction. In order to secure more than 640 picture elements in the horizontal direction, 10 bits are necessary for horizontal addresses.

However, with the horizontal addresses assumed to have 10 bits, it becomes possible to have 1,024 picture elements in the horizontal direction. Then, storage areas for 384 picture elements would be wasted. Since this number of wasted storage areas is accumulated by the number of picture elements in the vertical direction, a considerably large part would be wastefully left unused.

SUMMARY OF THE INVENTION

It is a general object of this invention to provide an image pickup apparatus which is capable of solving the above-stated problems of the conventional image pickup apparatus such as an electronic camera.

It is a more specific object of this invention to provide an image pickup apparatus which is capable of taking another shot even while an image picked up by one shot is in process of recording on a recording medium.

Under this object, a video signal recording apparatus arranged according to this invention as one embodiment thereof comprises first storage means for storing an image signal, second storage means for storing an image signal outputted from the first storage means, and control means for controlling the first storage means and the second storage means, the control means being arranged to suspend a storing action of the second storage means if the first storage means receives a second image signal while the second storage means is in process of storing a first image signal outputted from the first storage means.

It is another specific object of this invention to provide an image pickup apparatus which is capable of effectively using a memory to solve the inconvenience mentioned in the foregoing.

Under that object, a video signal recording apparatus arranged according to this invention as one embodiment thereof comprises first storage means for storing an image signal, the first storage means having a plurality of storage areas, second storage means for storing an image signal outputted from the first storage means, detecting means for detecting an unused storage area of the first storage means, and control means for controlling writing and reading the image signal into and out of the first storage means, the control means being arranged to cause an image signal stored in a first storage area of the first storage means to be stored in a second storage area of the first storage means according to the size of the unused storage area while the second storage means is arranged to store an image signal read out of the second storage area.

The above and other objects and features of this invention will become apparent from the following detailed description of embodiments thereof taken in conjunction with the accompanying drawings.

BRIEF DESCRIPTION OF THE DRAWINGS

FIG. 4 is a flow chart showing the details of steps S102 and S116 shown in FIG. 3.

FIG. 5 is a flow chart showing the procedures for an external output.

DETAILED DESCRIPTION OF THE PREFERRED EMBODIMENTS

Figure 1:
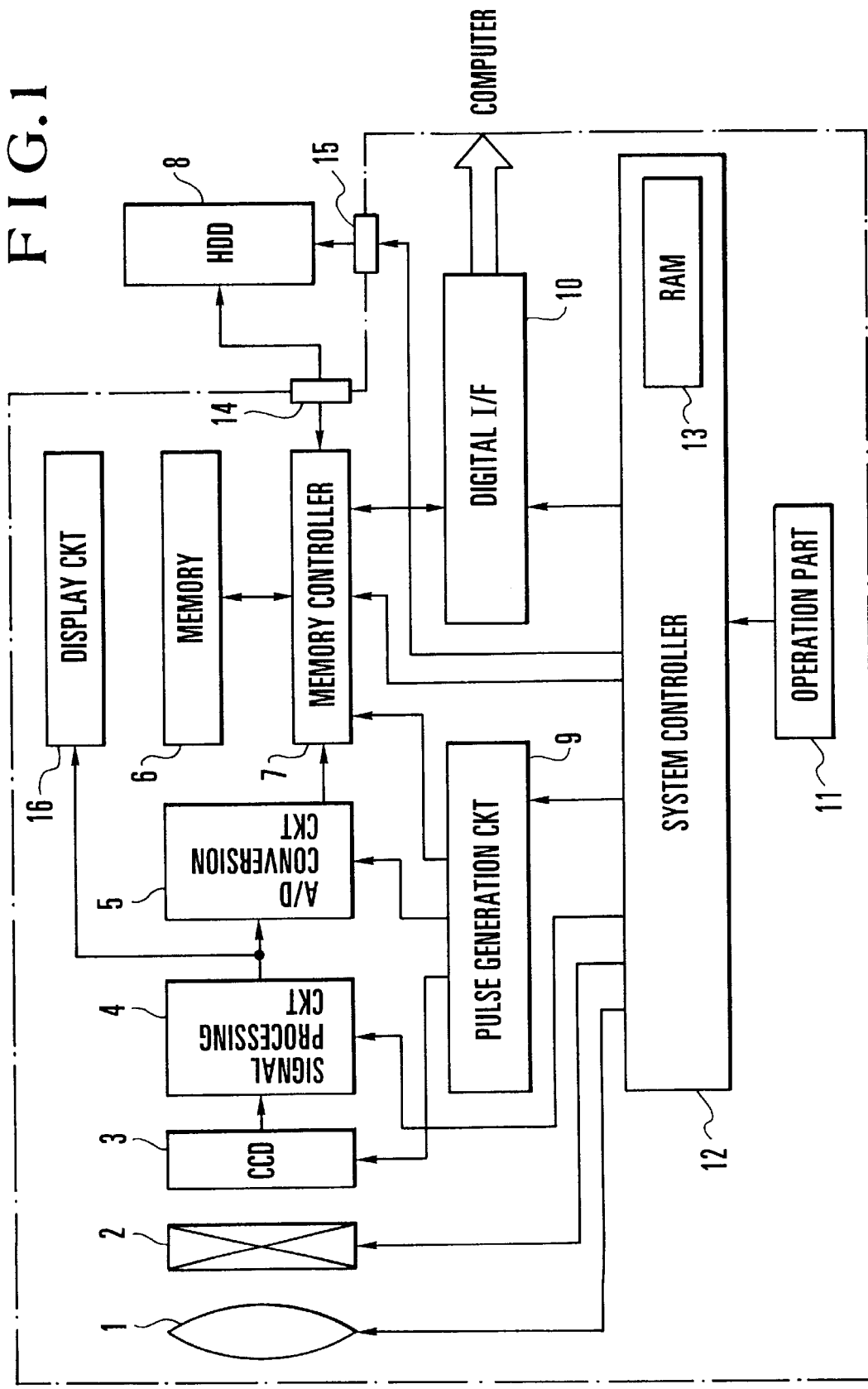
FIG. 1 is a block diagram showing an electronic camera arranged as a first embodiment of this invention.

A first embodiment of this invention is described as follows:

FIG. 1 shows in a block diagram the arrangement of an electronic camera arranged as the first embodiment of this invention. Referring to FIG. 1, a photo-taking lens 1 is arranged to form an object image on an image sensor 3. A shutter 2 is provided for exposing the image sensor 3 to the light of the object image passing through the photo-taking lens 1 for a predetermined length of time. The image sensor 3 is a CCD or the like and is arranged to convert the object image into an electrical signal. A signal processing circuit 4 is arranged to carry out various processes on an image signal coming from the image sensor 3, including correcting process of varied kinds, a clamping process, etc. An A/D conversion circuit 5 is arranged to convert an image signal outputted from the signal processing circuit 4 into a digital signal.

Figure 2:
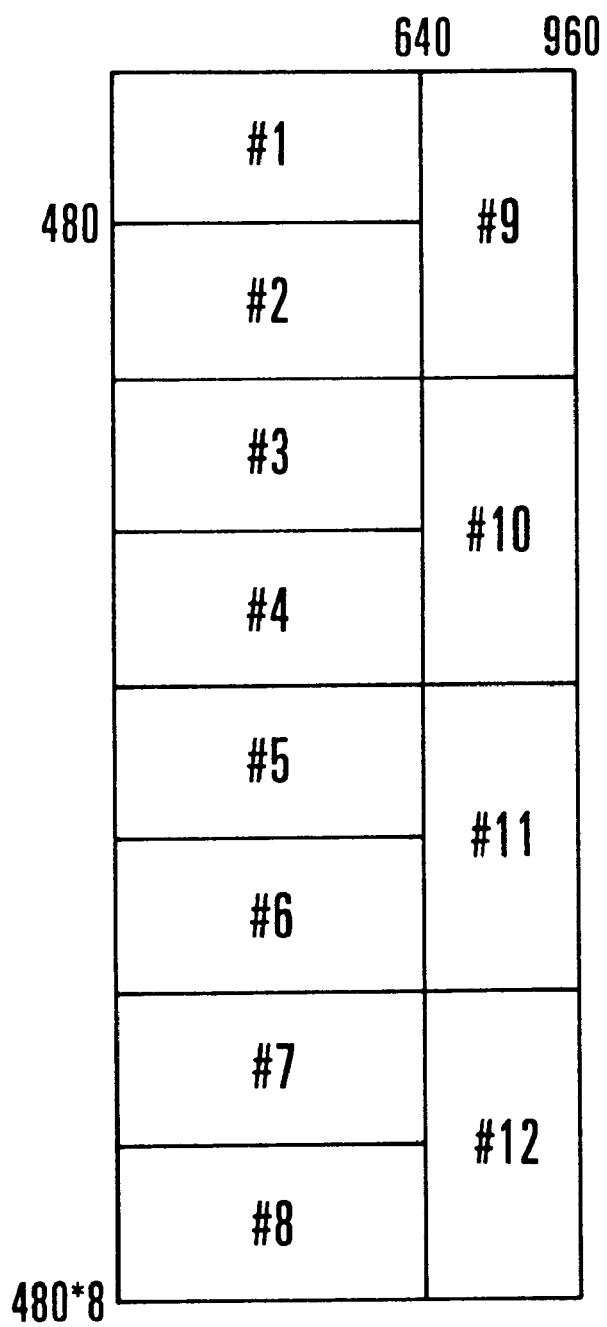
FIG. 2 shows the theoretical arrangement of storage areas of a memory 6 shown in FIG. 1.

A memory 6 is arranged to temporarily store image data outputted from the A/D conversion circuit 5. FIG. 2 shows the arrangement of the memory 6. In FIG. 2, numerals denote areas in which the image data is stored. In the case of this embodiment, one picture consists of 480 picture elements in the vertical direction and 640 picture elements in the horizontal direction, and the memory 6 is capable of storing twelve pictures.

A memory controller 7 is arranged to control the input and output of image data to and from the memory 6. A hard disk device (hereinafter referred to as HDD) 8 is detachably attachable to the body of the camera and serves as a magnetic recording medium for recording the image data thereon. The image signal is inputted to the HDD 8 from the memory controller 7 through an interface 14 which is provided for image data. Control data is inputted to the HDD 8 from a system controller 12 through an interface 15 which is provided for the control data. A pulse generation circuit 9 is arranged to supply driving timing signals respectively to the image sensor 3, the A/D conversion circuit 5 and the memory controller 7. A digital interface (hereinafter referred to as digital I/F) circuit 10 is provided for transmitting the image data to an external computer or the like (not shown).

An operation part 11 is arranged to permit the operator to give instructions to the camera and includes a shooting mode selection switch, a compression mode selection switch, a trigger switch, etc. The system controller 12 is arranged to control the electronic camera in accordance with the instructions inputted from the operation part 11. A random access memory (hereinafter referred to as RAM) 13 is provided within the system controller 12 for storing data. The interface 14 is provided for exchange of image data between the HDD 8 and the memory controller 7. The interface 15 is provided for transmitting a control signal from the system controller 12 to the HDD 8. A display circuit 16 is arranged to display an image related to the image signal outputted from the signal processing circuit 4.

The recording medium on which images picked up are to be recorded is not limited to the hard disk device. A recording medium other than the hard disk device may be selected from among a group consisting of an optical disk driving device, a magneto-optical disk driving device and solid-state memory devices such as a flash memory, an EEPROM, a DRAM backed up by a battery, etc. The solid-state memory devices also include a memory card which is arranged in a card-like shape.

The recording operation in an ordinary shooting mode of the electronic camera arranged as mentioned above is described below with reference to FIG. 3, which is a flow chart showing the flow of operation:

At a step S100, a variable m indicating the number of pictures which are stored in the memory 6 and have not been written in the HDD 8 as yet is cleared to zero. At a step S101, when an instruction for recording is given to the system controller 12 by means of a release switch provided in the operation part 11, the flow of operation proceeds to a step S102. At the step S102, a shot is taken. The data of an image thus picked up is stored, for example, in a storage area #1 among the areas #1 to #8 of the memory 6 shown in FIG. 2. At the same time, a signal is stored in the RAM 13 of the system controller 12, indicating that the image data is stored in the area #1 of the memory 6. The details of this step S102 will be described later.

At a step S103, the above-stated variable m is incremented by one. At a step S104, a check is made to find if the variable m is at zero. If not, the flow comes to a step S105. At the step S105, one of the storage areas of the memory 6 storing image data to be next recorded in the HDD 8 among the image data stored in the memory 6 (the area #1, in this instance) is decided on the basis of the data stored in the RAM 13. This image data is recorded on the HDD 8 as follows:

At a step S106, a variable n indicating the number of sectors which are units of recording on the HDD 8 is cleared to zero. At a step S107, again, a check is made to find if an instruction for recording is inputted. If not, the flow proceeds to a step S108 to cause an amount of image data corresponding to one sector within the area #1 of the memory 6 (one sector=512 bytes) to be recorded on the HDD 8. At a step S109, a check is made to find if any recording error has occurred during the process of the step S108. If not, the flow proceeds to a step S111 to increment the variable n by one.

Assuming that the image sensor 3 has 480×640 picture elements and the A/D conversion circuit 5 performs quantization in eight bits, an image area for one picture needs to include a total of 600 sectors.

Therefore, at a step S112, a check is made to find if the variable n is "600". In other words, the check is made to find if an amount of data for one picture has been completely recorded on the HDD 8. If not, the flow comes back to the step S107. After that, the flow proceeds to a step S113 to decrement the variable m by one and comes back to the step S104.

At the step S107, if an instruction for recording is received while the amount of image data of 600 sectors is still in process of recording, the flow comes to a step S114. At the step S114, data stored in the RAM 13 and the variable m are checked for the state of use of the memory 6. If the memory 6 is found to be still in a state of permitting recording, the flow proceeds to a step S115. At the step S115, the process of recording the image data (data stored in the area #1, in this instance) on the HDD 8 is suspended. Then, the value of the variable n, the recording address of the HDD 8, the reading address of the memory 6, etc., are stored in the RAM 13. After that, the flow comes to a step S116.

At the step S116, a shot is taken. Image data thus obtained is stored, for example, in the area #2 of the memory 6 (see FIG. 2). At the same time, a signal indicating that the image data is stored in the area #2 of the memory 6 is stored in the RAM 13. When the image data is completely stored in the area #2, the flow comes to a step S117. At the step S117, the variable m is incremented by one. The flow then comes to a step S118. At the step S118, the variable n and a recording address are set on the HDD 8 and a reading address is set at the memory controller 7. After that, the image data stored in the area #1 resumes being recorded on the HDD 8.

The least common multiple of the amount of data in the horizontal direction of the area #1 (640 bytes in the case of this embodiment) and the recording unit of 512 bytes (one sector) for recording on the HDD 8 is 2560 bytes, which correspond to an amount of data of five sectors. Therefore, in resuming the suspended recording of image data on the HDD 8, the image data is recorded by taking five sectors as the unit of recording.

In other words, in the event of interruption by an instruction for recording when, for example, an amount of image data of 127 sectors (n=127) within the amount of 600 sectors has been recorded on the HDD 8, the variable n is set at 125 in resuming the recording. A recording area corresponding to this variable is set at the HDD 8 and a reading address corresponding to this variable is set at the memory controller 7 at the step S118. The suspended recording of image data on the HDD 8 is thus resumed.

At a step S112, a check is made for completion of the process of recording the image data of the area #1 on the HDD 8. Upon completion of the recording, the flow comes to a step S113 to decrement the variable m by one. The flow then comes back to the step S104. Then, since the variable m is at "1" at this time, the flow comes to the step S105 to specify one of the areas of the memory 6 in which image data to be next recorded is stored (which is the area #2 at this time), on the basis of the data stored in the RAM 13.

After that, the image data stored in the area #2 of the memory 6 is recorded on the HDD 8 in the same manner as described above. The variable m is decremented by one at the step S113. When the variable m is found to be at zero (at the step S104), the flow comes to an end.

In the event of occurrence of a recording error due to some reason while the 600 sector amount of image data is in process of recording at the step S109, the recording error is compensated for in units of the least common multiple of the horizontal data amount in the applicable area of the memory 6 and the unit of recording on the HDD 8, i.e., the data amount of five sectors, in the same manner as in the case of resumption of suspended recording of image data on the HDD 8.

For example, assuming that a recording error is caused to take place by some reason when the variable n is at 361 indicating that the image data of the 361st sector in the amount of image data of 600 sectors has been recorded on the HDD 8, the compensation is made for the recording error by setting the variable n at 360 and by setting a recording address corresponding to this variable at the HDD 8 and a reading address corresponding to this variable at the memory controller 7 at a step S110.

Figure 3:
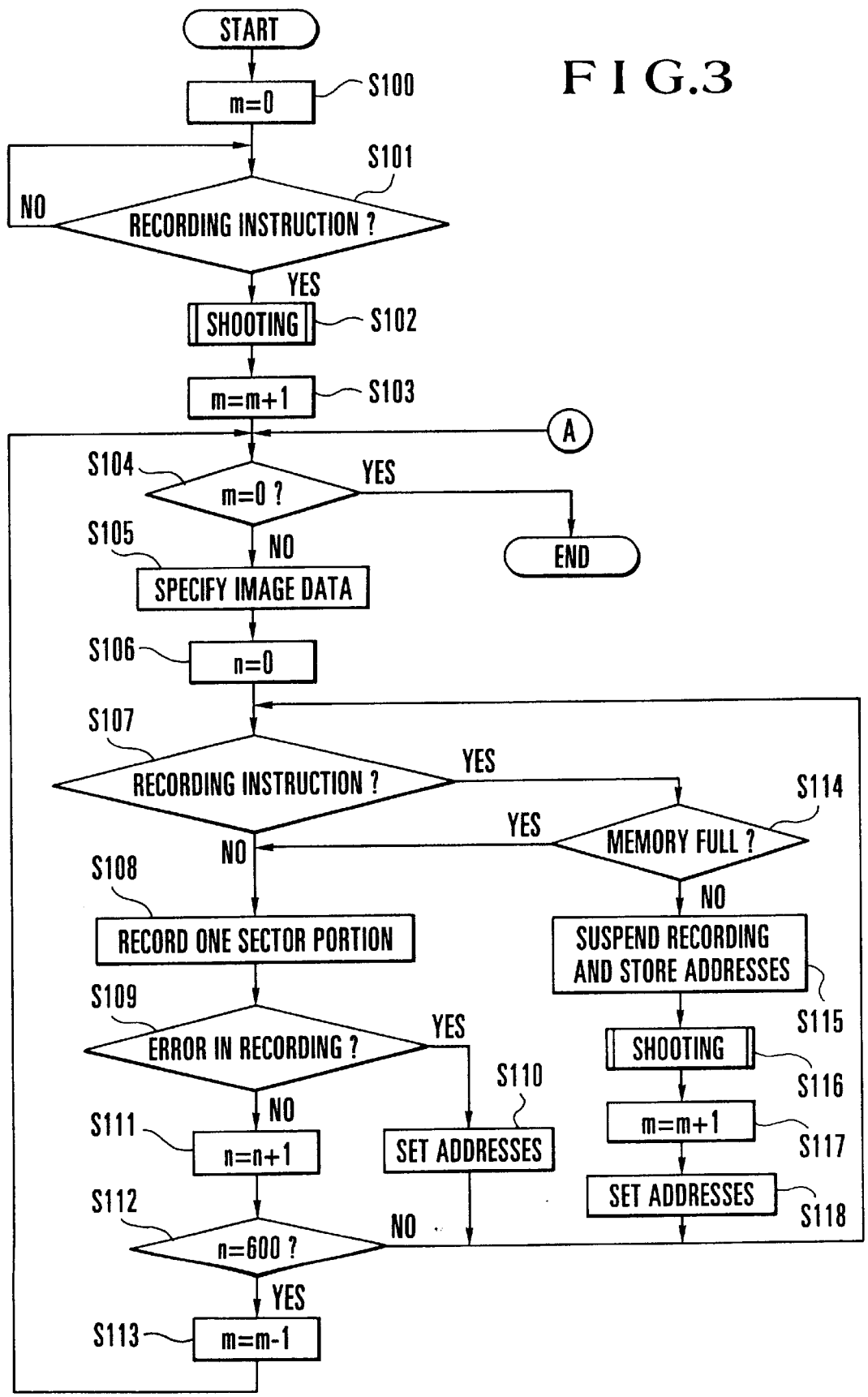
FIG. 3 is a flow chart showing the operation of the first embodiment of this invention as being performed in an ordinary shooting mode of the embodiment.

The details of the shooting and processing actions of the steps S102 and S116 shown in FIG. 3 are described next with reference to FIG. 4 which is a flow chart as follows: At a step S200, when the system controller 12 is instructed to perform recording from the release switch of the operation part 11, the system controller 12 detects the luminance of the shooting object by means of a light measuring sensor, which is not shown, and makes an exposure by driving the shutter 2 with a shutter speed and an aperture adjusted.

At a step S201, an image signal is read out from the image sensor 3 and the flow comes to a step S202. At the step S202, the signal processing circuit 4 performs color correction and other processes of varied kinds on the image signal read out. At a step S203, an analog image signal outputted from the signal processing circuit 4 is converted into a digital image signal by the A/D conversion circuit 5. At a step S204, the digital image signal (data) is stored in the memory 6 through the memory controller 7. In recording on the HDD 8, the image data stored in the memory 6 is read out and recorded on the HDD 8 through the memory controller 7.

In transmitting the image data stored in the memory 6 to an external computer, the embodiment operates as described below with reference to FIG. 5 which is a flow chart:

At a step S300, the variable n which indicates the number of sectors is cleared to zero. At a step S301, an amount of image data corresponding to one sector within an applicable area of the memory 6 (one sector=512 bytes) is transmitted to the external computer (not shown) through the digital I/F circuit 10. At a step S304, the variable n is incremented by one and the flow proceeds to a step S305. At the step S305, a check is made to find if an amount of image data corresponding to one picture has been transmitted. If not, the flow comes back to the step S301. If so, the transmitting operation comes to an end.

In a case where a communication error happens due to some reason while the 600 sector amount of image data is still in process of transmission and a request for retransmission is received from the external computer, compensation for the communication error is made by retransmitting the image data in unit amount of data which corresponds to the least common multiple of the data amount in the horizontal direction of the applicable area of the memory 6 and the recording unit amount for recording on the HDD 8, i.e., an amount of data of five sectors, in the same manner as in the case of resumption of the suspended recording on the HDD 8.

For example, at the step S302, if the error takes place when the variable n is at 53, that is, when the 53rd sector of image data within the 600 sector amount of image data is transmitted, the flow comes to a step S303 to set the variable n at 50 and adjust the reading address of the memory controller 7 to an address corresponding to n=50. The flow then comes back to the step S301 to retransmit and compensate for the communication error by reading the image data from the address set by the process of the step S303.

The external computer which is on the receiving side also makes a compensation for the error in the same manner by again receiving the image data.

In the case of this embodiment, the memory controller 7 is arranged to send image data read out from the HDD 8 directly to the digital I/F circuit 10. However, this arrangement may be changed to store the image data read out from the HDD 8 temporarily in the memory 6 and to transfer the image data to the digital I/F circuit 10 in accordance with the procedures shown in FIG. 5. This modification is more advantageous than the embodiment depending on the speed of communication.

Further, the embodiment is arranged to suspend the action of reading out the data from the memory 6 and applying the read out data to the HDD 8 in the event of occurrence of an action of writing the output of the A/D conversion circuit 5 into the memory 6. However, this arrangement may be changed to control the two actions respectively by different circuits and to have the memory 6 used in common by the two circuits. The suspension of transfer from the memory 6 to the HDD 8 can be avoided by that modification. In other words, the modification obviates the necessity of making a decision at the step S107 of FIG. 3 for branching, so that the speed of transfer from the memory 6 to the HDD 8 can be substantially increased.

As described above, the embodiment is arranged such that, when an instruction is given for storing second image data while first image data is still in process of recording on a recording medium, the process of recording the first image data is suspended and the second image data is stored in an area other than an area in which the first image data is stored. After that, the process of recording the first image data is resumed. After completion of recording the first image data, the second image data is recorded on the recording medium, so that another image can be newly picked up even while data of an image is still being recorded on the recording medium.

A second embodiment of this invention which is an electronic camera is described as follows: The second embodiment is described through the operation of the electronic camera in a continuous shooting mode. The arrangement of the electronic camera is the same as that of the first embodiment described in the foregoing.

Figure 6:
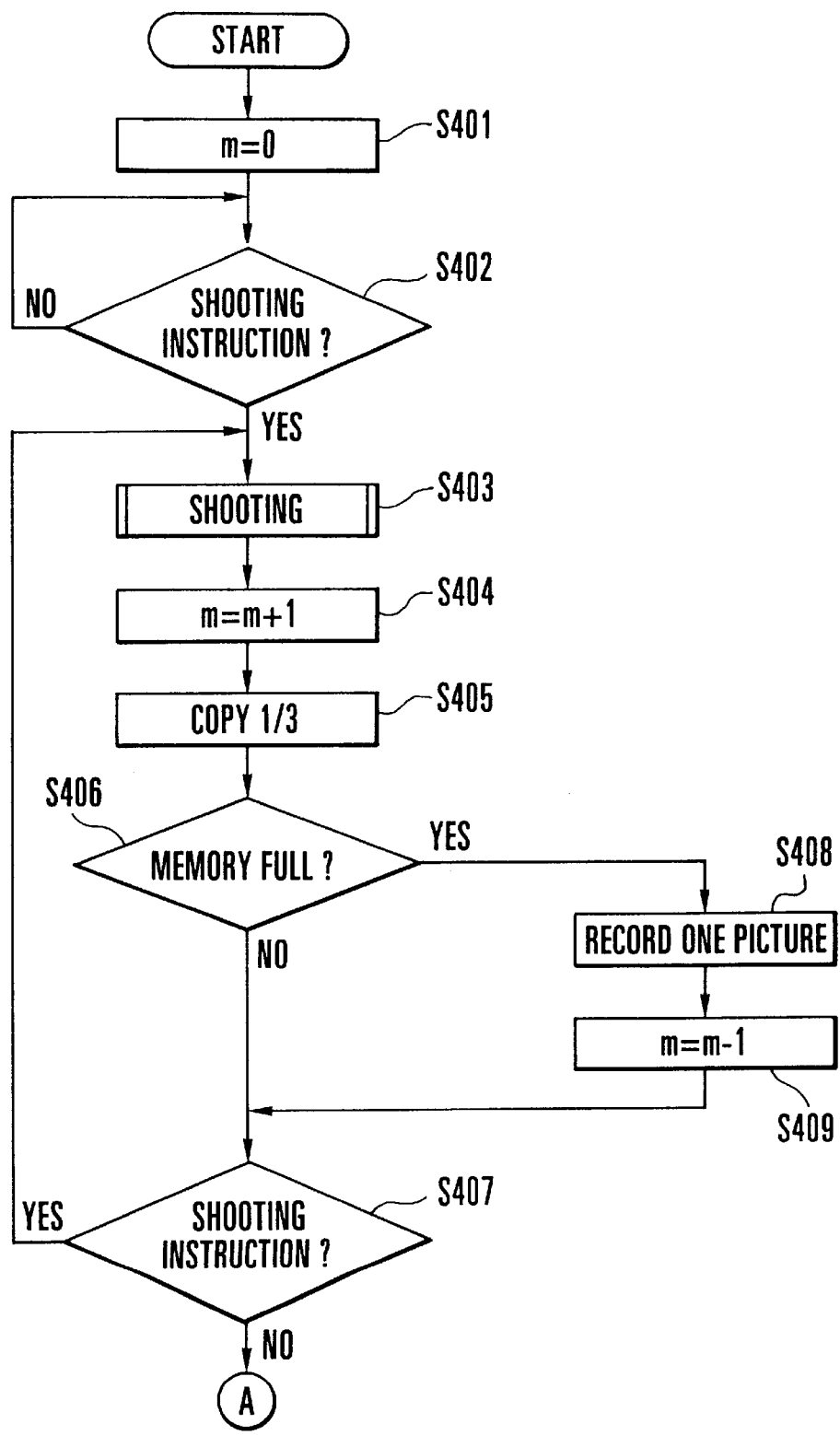
FIG. 6 is a flow chart showing an operation performed in a continuous shooting mode.

FIG. 6 is a flow chart showing the operation of the electronic camera in its continuous shooting mode. In the case of the second embodiment, image data obtained by continuous shooting is serially stored in the areas #1 to #8 of the memory 6 one after another. During each of intervals between one shot and another of the continuous shooting, ⅓ of the image data is copied in each of the areas #9 to #12 (see FIG. 2). When an amount of image data for one picture has been copied, the storing area subjected to copying is evacuated for an image to be next picked up, so that the areas #9 to #12 can be efficiently used.

The operation is described in detail with reference to FIG. 6, which shows a flow of the operation. At a step S401, a variable m is first cleared. At a step S402, the flow wait for an instruction for shooting from the operation part 11. Upon receipt of the instruction for shooting, the flow comes to a step S403. At the step S403, the image sensor 3 is exposed to light. The data of images thus picked up is stored in vacant areas among the areas #1 to #8 one after another. The details of the step S403 are identical with what is shown in FIG. 4.

At a step S404, a first image is stored in the area #1 of the memory 6. The system controller 12 stores information on the fact that the data of the image picked up is stored in the area #1, and increments a variable m by one. At a step S405, one third of image data for one picture already stored in the memory 6 is copied in a vacant area available among the areas #9 to #12. At this moment, one third of the image data written in by the step S403 is copied in the area #9. If the memory is found not full at a step S406 and if the signal of the instruction for shooting is found to remain effective at a step S407, the step S403 for shooting, the step S404 for incrementing the variable m by one and the step S405 for copying one third of the image data in storage are repeated. With these steps repeated, one half of the remaining ⅔ of the first image data is copied in the area #9 when a second shot is taken. At the third shot, the remaining ⅓ of the first image data is copied in the area #9. In this stage, the whole of the first image data is copied in the area #9. Then, the area #1 is evacuated for a further shooting. At that moment, information on the fact that the image data of the first shot is stored in the area #9 is memorized by the RAM 13.

When the memory 6 is found to be full at the step S406, the flow comes to a step S408. At the step S408, the image data first written into the memory 6 is read out and recorded on the HDD 8. At a step S409, the variable m is decremented by one.

The sequence (order of succession) of use of the storage areas #1 to #12 of the memory 6 is described with reference to FIGS. 7 to 10 as follows: In FIGS. 7 to 10, numerals denote the sequency of shots. The image data obtained by each shot taken is written in a storage area indicated by an applicable numeral.

Figure 7:
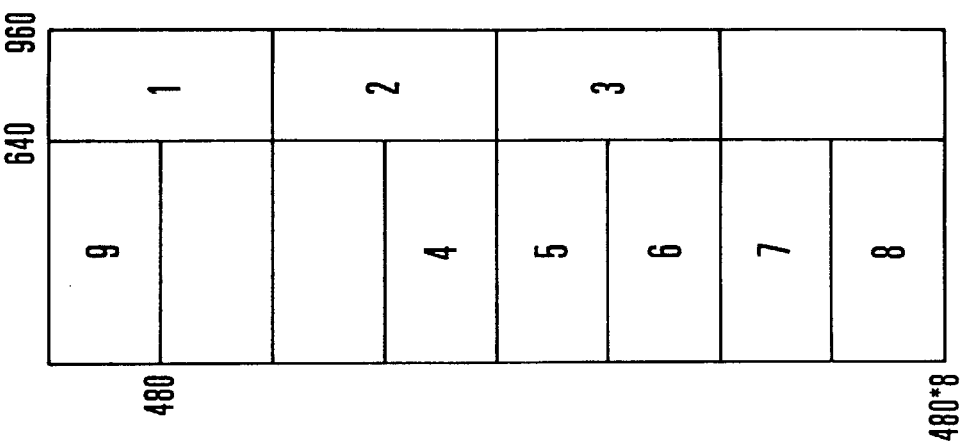
FIG. 7 shows a state of the memory 6 obtained when it is used in the continuous shooting mode.
Figure 8:
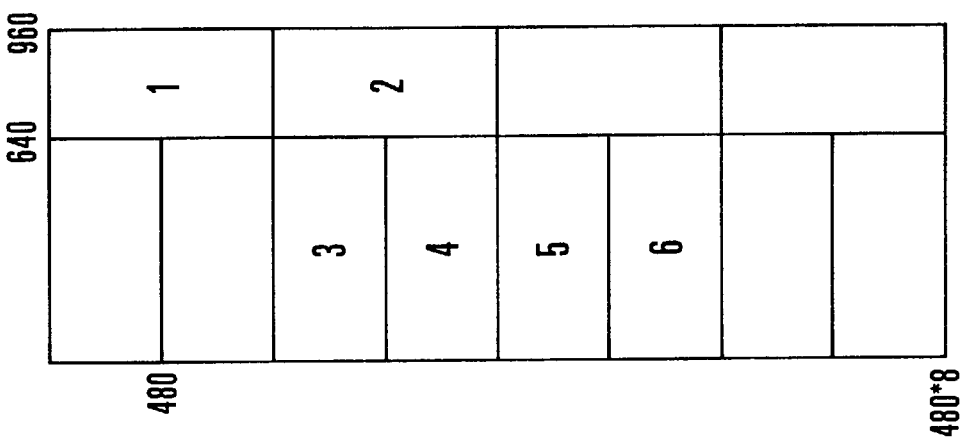
FIG. 8 shows another state of the memory 6 obtained also in the continuous shooting mode.

FIG. 7 shows the state of the memory 6 obtained after the image data obtained by the third shot is stored in the area #3 of the memory 6 at the step S403 and one third of the image data is copied at the step S405. As mentioned in the foregoing, the image data resulting from the first shot is copied in the area #9 to evacuate the area #1. While the image data obtained by fourth, fifth and sixth shots are serially stored in the areas #4, #5 and #6, the image data of the second shot stored in the area #2 is copied in the area #10. Then, after the image data of the sixth shot is stored in the area #6 of the memory 6 (the step S403) and one third of it is copied (step S405), the whole of the image data of the second shot is copied in the area #10 to evacuate the area #2. The state of the memory 6 then becomes as shown in FIG. 8.

Figure 9:
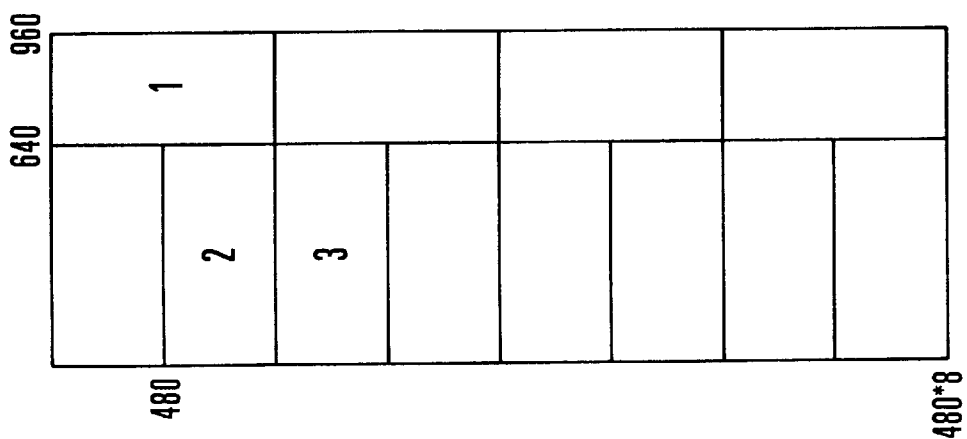
FIG. 9 shows a further state of the memory 6 obtained also in the continuous shooting mode.

While the image data of seventh, eighth and ninth shots are serially stored likewise in the areas #7, #8 and #1, the image data of the third shot is copied in the area #11. After the image data of the ninth shot is stored in the area #1 of the memory 1 (at the step S403) and one third of it is copied (at the step S405), the whole of the image data of the third shot is copied in the area #11. The area #3 is then evacuated to bring the memory 6 into a state which is as shown in FIG. 9.

Figure 10:
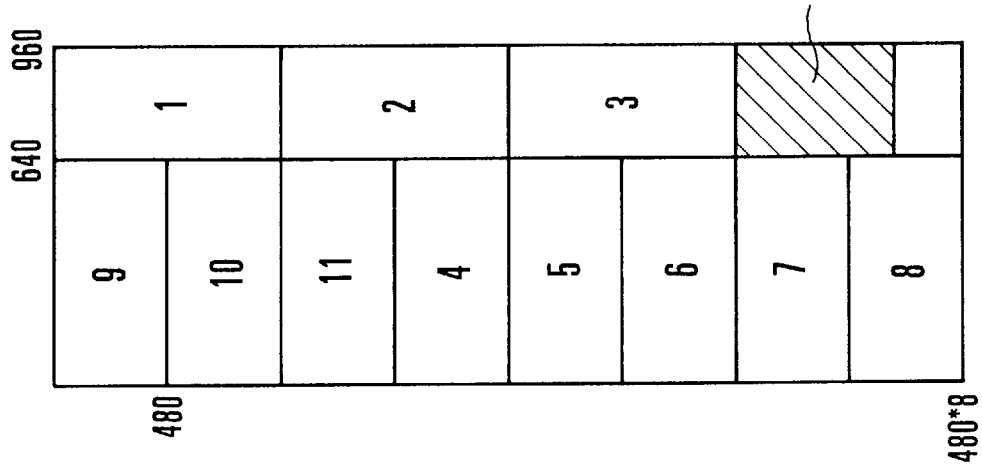
FIG. 10 shows a still further state of the memory 6 obtained in the continuous shooting mode.

While the image data of 10th and 11th shots are stored one after another in the areas #2 and #3, the image data of the fourth shot stored in the area #4 is copied in the area #12. After the image data of the 11th shot is stored in the area #3 (at the step S403) and one third of the the image data of the fourth shot stored in area #4 is copied (at the step S405), the memory 6 becomes substantially full as shown in FIG. 10. In this state, one third of the image data of the fourth shot still remains not copied in the area #4, after two thirds of the image data are copied there. The area #4 therefore cannot be evacuated for the image data of a new shot. As a result, the memory 6 no longer leaves any room for storing new image data for further shooting.

After completion of the continuous shooting operation at the step S407, the flow of operation shifts to the step S104 of FIG. 3 to transfer unrecorded image data stored in the memory 6 and record it on the HDD 8.

The memory 6 has been described as if the areas #9 to #12 are to be used when the electronic camera is in a continuous shooting mode. This is because the areas #1 to #8 are seldom occupied at the same time in an ordinary (single shot) shooting mode. However, the areas #9 to #12 of course may be utilized in the ordinary shooting mode in the same manner as in the continuous shooting mode. In that case, for example, an HDD having a slower writing speed can be employed as the recording medium.

In the case of this embodiment, one third of the image stored in each of the areas #1 to #8 is arranged to be copied at a time in each of the areas #9 to #12. The unit amount of copying is not limited to one third but may be decided according to the speed of continuous shooting.

In the embodiment, the areas #1 to #8 for which the writing addresses can be easily and quickly decided on the memory 6 are used for writing the data of images picked up while the areas #9 to #12 which have been left unused by the conventional arrangement are used, so to speak, as a buffer in transferring to the HDD 8 the picked-up image data stored in the areas #1 to #8. The whole storage area of the memory 6 thus can be effectively used. Besides, the shooting speed, particularly the continuous shooting speed, can be increased.

Figure 11:
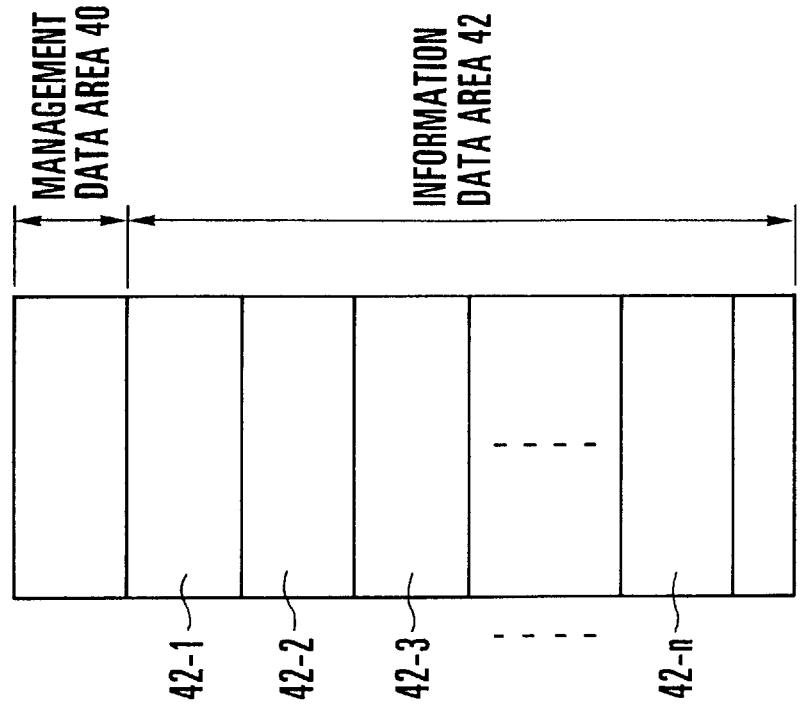
FIG. 11 schematically shows the recording areas of a hard disk device 8.

Next, a method for recording the picked-up image signal on the HDD 8 is described as follows: FIG. 11 schematically shows the recording areas arranged on the HDD 8. The recording area of the HDD 8 is divided into a management data area 40 for recording management data and an information data area 42 for recording information data. The information data area 42 is used for recording images and is divided into image areas 42-1, - - -, 42-n, each being arranged to be in a predetermined size (for example, 600 sectors) which permits recording one picture amount of image data therein. In the management data area 40, management information such as the state of use of the information data area 42 (recorded or unrecorded), the size of data, recording date of each data, the recorded position of each data, etc., is recorded in the same manner as in recording computer data.

Figure 12:
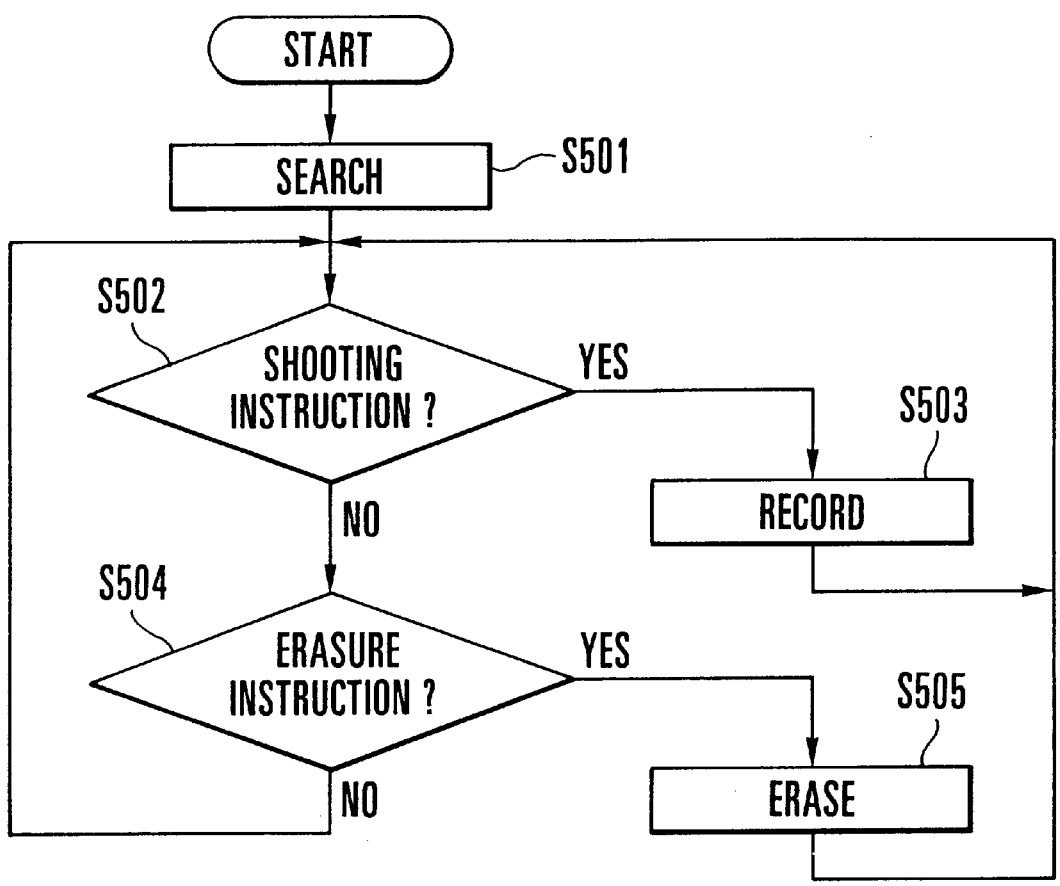
FIG. 12 is a flow chart showing recording and erasing actions on the hard disk device 8.

FIG. 12 is a flow chart showing recording and erasing actions on the HDD 8. At a step S501, the recorded state of the information data area 42 is first found by searching the management data area 40 and is stored in the RAM 13 disposed within the system controller 12. At a step S502, when an instruction for shooting is received from the operation part 11, the flow of operation comes to a step S503 to record the data of an image picked up. In recording the image data, a search is made with reference to the RAM 13 for an unrecorded area among the image recording areas 42-1, - - - , 42-n one by one. The image data is recorded in an unrecorded area thus detected. Consecutive image data recording areas thus can be secured to permit high-speed recording. At a step S504, when an instruction for erasure is inputted from an operation switch which is not shown, the flow comes to a step S505. At the step S505, the erasing action is carried out and predetermined data which indicates an unrecorded state is written into the management data area 40.

As apparent from the above description, the embodiment is arranged to effectively utilize the intermediate memory means without much decreasing the speed of continuous shooting. Therefore, the number of frames obtainable by one continuous shooting operation can be increased in accordance with the invented arrangement.

Further, since the recording medium is managed by treating each picture as the unit of management, the recording speed can be substantially increased in a stable manner so that the length of time necessary for recording can be shortened.

What is claimed is:

1. An image signal recording apparatus for recording an image signal on a recording medium, comprising:
    (a) image take-in means for taking in an image signal to output the taken in image signal;
    (b) a semi-conductor memory for storing temporarily the image signal outputted from said image take-in means and outputting the image signal temporarily stored;
    (c) instructing means for instructing the semiconductor memory to store the image signal outputted from said image take-in means;
    (d) recording means for recording on the recording medium, said medium being different from the semiconductor memory, the image signal outputted from the semiconductor memory; and
    (e) operation control means for monitoring whether instruction is made to store new image signal outputted from the image take-in means in the semiconductor memory by the instruction means during the recording of the image signal stored in the semiconductor memory by the recording means, and for suspending the recording of the image signal on the recording medium by the recording means when detection is made that the instruction has been made, and thereafter for starting the storing operation of the new image signal outputted from the image take-in means in the semiconductor memory.

2. An apparatus according to claim 1, wherein said semiconductor memory includes a plurality of storage areas for storing temporarily the image signal.

3. An apparatus according to claim 2, wherein said operation control means controls the apparatus so as to monitor whether instruction is made to store a new image signal taken in from the image take-in means in the semiconductor memory by the instruction means just during the recording of the image signal stored in a first storage area of plural storing areas of the semiconductor memory by the recording means: to suspend recording of the image signal on the recording medium of the recording means; to temporarily store the new image signal outputted from the image take-in means in a second storing, area different from the first storing area of the plural storing areas of the semiconductor memory; thereafter to restart the recording of the image signal stored in the first storing area of the semiconductor memory on the recording medium; and to record the new image signal stored in the second storing area of the semiconductor memory on the recording medium.

4. An apparatus according to claim 1, wherein said semiconductor memory includes a first group of storage areas comprising a plurality of storage areas for storing temporarily an image signal corresponding to a picture and a second group of storage areas, said second group being different from said first group of storage areas, comprising a plurality of storage areas for storing temporarily the image signal corresponding to the picture, and divides and stores, when the image signal corresponding to the picture is temporarily stored, the image signal corresponding to the picture in said plurality of storage areas of which said first group of storage areas and/or said second group of storage areas are comprised.

5. An apparatus according to claim 4, wherein the operation control means controls the apparatus so as to monitor whether instruction is made by the instruction means to store the new image signal outputted from the image-take-in means in the semiconductor memory just during the recording of the image signal stored in the first storing area of the semiconductor memory by the recording means:

to record part of the image signals stored in one of plural storing areas constituting a first group of storing areas of the semiconductor memory; after completion of the recording, to suspend the recording of the image signal by the recording means on the recording medium; to temporarily storing the new image signal outputting from the image take-in means in a second group of storing areas of the semiconductor memory; thereafter, to restart the recording of the image signal stored in the first group of storing areas of the semiconductor memory; and after completion of the restarted recording, to record the new image signal stored in the second group of storing areas of the semiconductor memory on the recording medium.

\* \* \* \* \*

UNITED STATES PATENT AND TRADEMARK OFFICE
CERTIFICATE OF CORRECTION

PATENT NO. : 5,949,950
DATED : September 7, 1999
INVENTOR(S) : Ryoji Kubo

It is certified that error appears in the above-identified patent and that said Letters Patent are hereby corrected as shown below:

Col. 1, line 39, delete "points:" and insert -- points. --.
Col. 4, lines 30-31, before "outputted" delete -- 9. --.
Col. 4, line 45, delete "operation:" and insert -- operation. --.
Col. 4, line 67, delete "follows:" and insert -- follows. --.
Col. 6, line 31, delete "follows:" and insert -- follows. --.
Col. 6, line 52, delete "chart:" and insert -- chart. --.
Col. 7, line 57, delete "follows:" and insert -- follows. --.
Col. 8, line 8, delete "wait" and insert -- waits --.
Col. 8, line 44, delete "follows:" and insert -- follows. --.
Col. 9, line 47, delete "follows:" and insert -- follows. --.
Col. 10, line 16, after "decreasing" insert -- of --.
Col. 10, line 66, delete "storing," and insert -- storing --.

Signed and Sealed this

Tenth Day of April, 2001

NICHOLAS P. GODICI

*Attest:*

*Attesting Officer*     *Acting Director of the United States Patent and Trademark Office*